(12) United States Patent
Kim

(10) Patent No.: US 10,212,245 B2
(45) Date of Patent: Feb. 19, 2019

(54) APPLICATION MODULE DATA CONTROL APPARATUS AND DATA CONTROL METHOD THEREOF

(71) Applicant: LG CHEM, LTD., Seoul (KR)

(72) Inventor: Jihoon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 264 days.

(21) Appl. No.: 14/889,610

(22) PCT Filed: Oct. 31, 2014

(86) PCT No.: PCT/KR2014/010345
§ 371 (c)(1),
(2) Date: Nov. 6, 2015

(87) PCT Pub. No.: WO2015/065089
PCT Pub. Date: May 7, 2015

(65) Prior Publication Data
US 2016/0088110 A1    Mar. 24, 2016

(30) Foreign Application Priority Data
Oct. 31, 2013  (KR) .................. 10-2013-0130744

(51) Int. Cl.
*G06F 15/16*        (2006.01)
*H04L 29/08*        (2006.01)
*B60L 11/18*        (2006.01)

(52) U.S. Cl.
CPC ...... *H04L 67/2819* (2013.01); *B60L 11/1851* (2013.01); *B60L 11/1861* (2013.01);
(Continued)

(58) Field of Classification Search
CPC ...... B60L 3/00; B60L 11/1861; H04L 67/125; H04L 67/2819; G01R 31/3606
(Continued)

(56) References Cited

U.S. PATENT DOCUMENTS 6,618,668 B1 * 9/2003 Laird ................ G06Q 10/08
340/994
7,710,074 B2 * 5/2010 Kim ................ H02J 7/0047
320/132
(Continued)

FOREIGN PATENT DOCUMENTS

CN    102738525 A    10/2012
JP    2005-328620 A    11/2005
(Continued)

OTHER PUBLICATIONS

International Search Report, issued in PCT/KR2014/010345, dated Jan. 28, 2015.
(Continued)

*Primary Examiner* — Imad Hussain
(74) *Attorney, Agent, or Firm* — Birch, Stewart, Kolasch & Birch, LLP

(57) ABSTRACT

Provided is an application module data control apparatus and a data control method thereof, and more particularly, to an application module data control apparatus and a data control method thereof which relay sharing of data to be shared among one or more application modules that perform functions of a battery management system (BMS) in the middle to remove data dependency of one or more respective application modules.

2 Claims, 5 Drawing Sheets

(52) U.S. Cl.
CPC .......... *H04L 67/125* (2013.01); *Y02T 10/705* (2013.01); *Y02T 10/7005* (2013.01); *Y02T 10/7044* (2013.01)

(58) Field of Classification Search
USPC ........................................................ 709/202
See application file for complete search history.

(56) References Cited

U.S. PATENT DOCUMENTS

| | | | | |
|---|---|---|---|---|
| 8,320,373 | B2* | 11/2012 | Iraninejad | H04L 49/90 370/389 |
| 9,015,513 | B2* | 4/2015 | Murawski | H04W 52/0261 713/340 |
| 9,395,419 | B2* | 7/2016 | Park | G01R 31/3679 |
| 9,438,550 | B2* | 9/2016 | Fiatal | H04W 76/10 |
| 9,749,206 | B2* | 8/2017 | Jung | H04L 43/0876 |
| 2003/0209375 | A1 | 11/2003 | Suzuki et al. | |
| 2004/0098587 | A1* | 5/2004 | Sueyoshi | H04L 63/0428 713/169 |
| 2004/0267784 | A1* | 12/2004 | Byng | G06F 9/54 |
| 2005/0240682 | A1* | 10/2005 | Zhang | H04L 67/125 710/2 |
| 2006/0143439 | A1* | 6/2006 | Arumugam | G06Q 10/08 713/153 |
| 2006/0173750 | A1* | 8/2006 | Naley | G06Q 20/12 705/26.81 |
| 2006/0208693 | A1* | 9/2006 | Emori | H02J 7/0047 320/106 |
| 2007/0090804 | A1* | 4/2007 | Kim | H02J 7/0047 320/132 |
| 2007/0225026 | A1* | 9/2007 | Bennett | H04W 52/04 455/522 |
| 2008/0036421 | A1* | 2/2008 | Seo | B60K 6/28 320/132 |
| 2009/0124288 | A1 | 5/2009 | Song et al. | |
| 2010/0094496 | A1* | 4/2010 | Hershkovitz | B60L 3/12 701/22 |
| 2010/0315035 | A1* | 12/2010 | Belov | H01M 10/46 320/101 |
| 2011/0078092 | A1* | 3/2011 | Kim | B60L 11/1824 705/412 |
| 2011/0095765 | A1* | 4/2011 | Tae | G01R 31/3658 324/434 |
| 2011/0307668 | A1* | 12/2011 | Fabregas | G06F 8/60 711/147 |
| 2012/0038314 | A1* | 2/2012 | Stewart | H01M 16/006 320/103 |
| 2012/0133332 | A1* | 5/2012 | Ogane | B60K 6/48 320/134 |
| 2012/0210310 | A1* | 8/2012 | Cooley | G06F 8/65 717/168 |
| 2012/0215391 | A1 | 8/2012 | Schaefer et al. | |
| 2012/0215754 | A1* | 8/2012 | Marzani | F02D 41/266 707/705 |
| 2012/0256009 | A1* | 10/2012 | Mucignat | G05D 23/1905 236/1 C |
| 2012/0303182 | A1* | 11/2012 | Choi | G08C 17/02 701/2 |
| 2012/0319657 | A1* | 12/2012 | Ke | H02J 7/0021 320/134 |
| 2013/0093384 | A1* | 4/2013 | Nyu | G01R 31/3606 320/107 |
| 2013/0113433 | A1* | 5/2013 | Shibata | B60L 11/14 320/134 |
| 2013/0117595 | A1* | 5/2013 | Murawski | H04W 52/0261 713/340 |
| 2013/0144547 | A1* | 6/2013 | Yun | G01R 31/3624 702/63 |
| 2013/0198541 | A1* | 8/2013 | Rabii | G06F 1/26 713/320 |
| 2014/0028681 | A1* | 1/2014 | Hirayama | G01R 31/3606 345/440 |
| 2014/0122702 | A1* | 5/2014 | Jung | H04L 43/0876 709/224 |
| 2014/0123299 | A1* | 5/2014 | Jung | G06F 17/30312 726/26 |
| 2014/0123325 | A1* | 5/2014 | Jung | G06F 21/6254 726/30 |
| 2014/0365065 | A1* | 12/2014 | Leonard | B60L 11/1805 701/29.6 |
| 2015/0019923 | A1* | 1/2015 | Michels | G06F 15/17331 714/718 |

FOREIGN PATENT DOCUMENTS

| | | |
|---|---|---|
| JP | 4587975 B2 | 11/2010 |
| KR | 10-2009-0049154 A | 5/2009 |
| KR | 10-2012-0069705 A | 6/2012 |

OTHER PUBLICATIONS

Park, Chan-Hee et al., "Development of a battery management system(BMS) simulator for electric vehicle(EV) cars", Journal of the Korea Academia-Industrial cooperation Society, 2012, vol. 13, No. 6, pp. 2484-2490. 2 pages.

Written Opinion of the International Searching Authority, issued in PCT/KR2014/010345, dated Jan. 28, 2015.

* cited by examiner

[Figure 1]
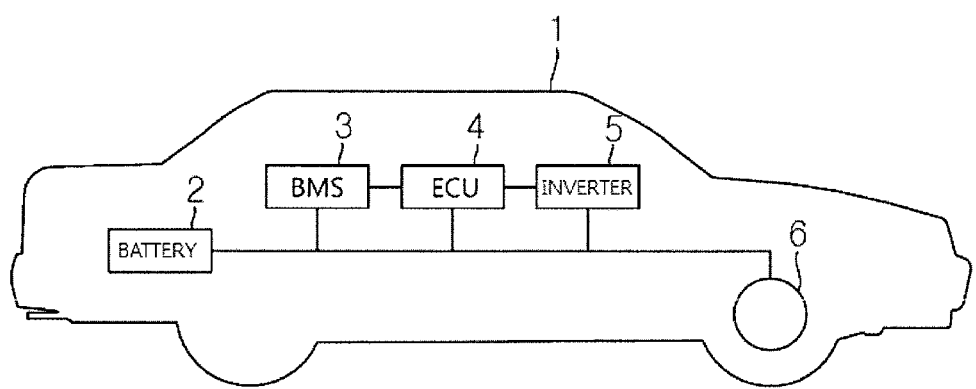

[Figure 2]
PROJECT A: SOC OPERATION BY VOLTAGE AND CURRENT
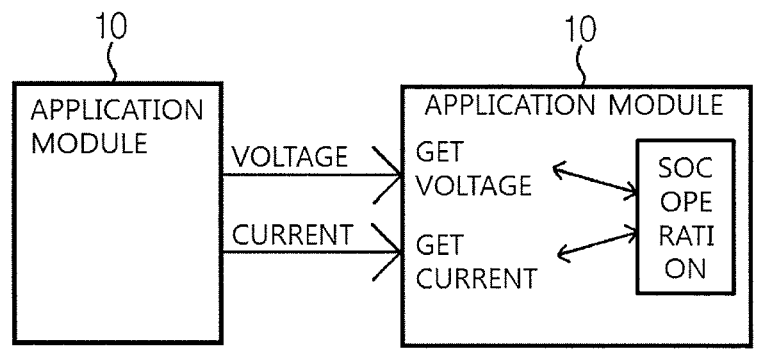
PROJECT B: SOC OPERATION BY CURRENT
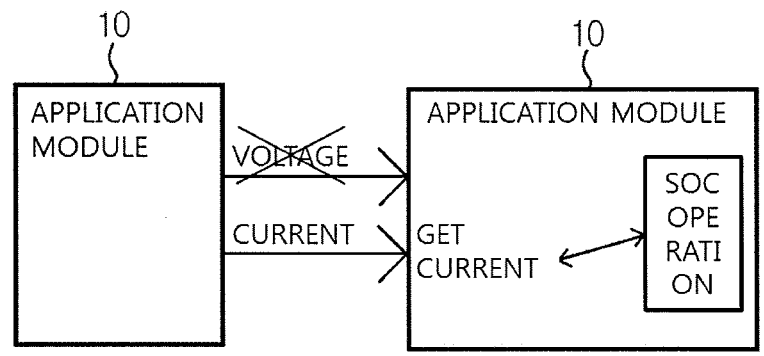

[Figure 3]
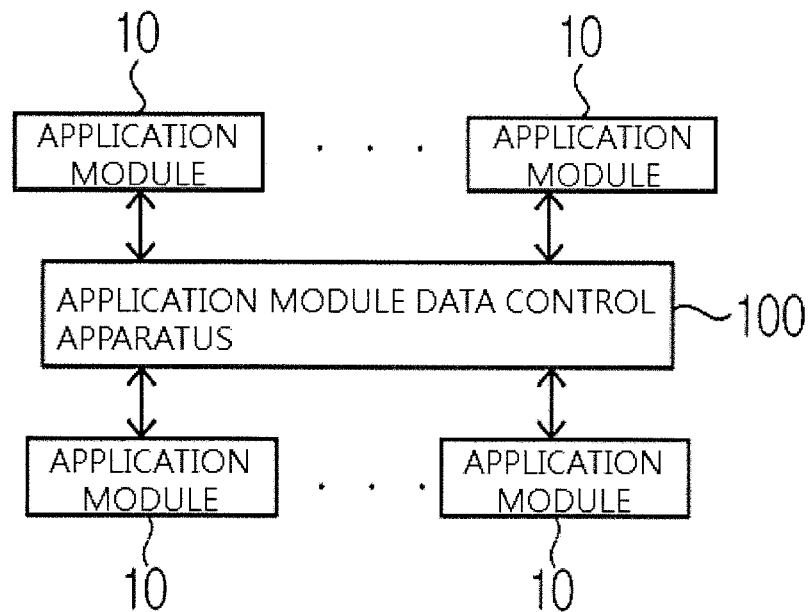
[Figure 4]
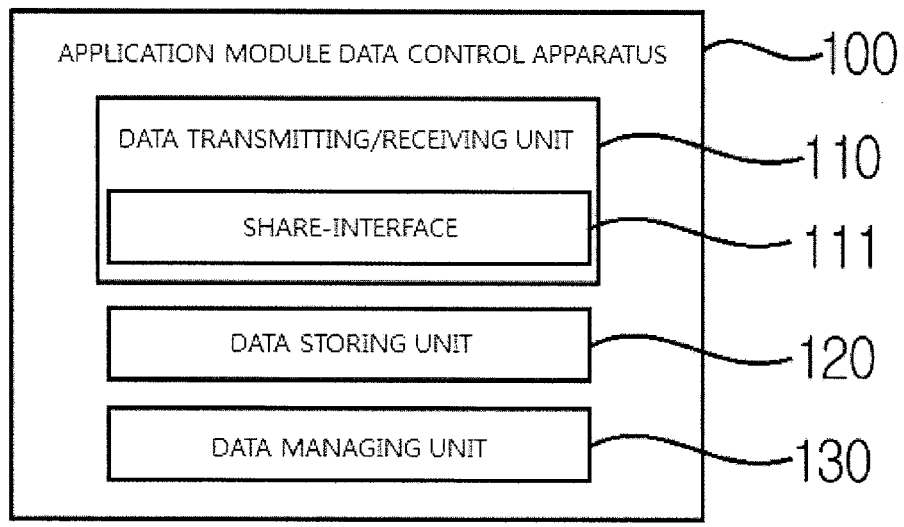

[Figure 5]
PROJECT A: SOC OPERATION BY VOLTAGE AND CURRENT
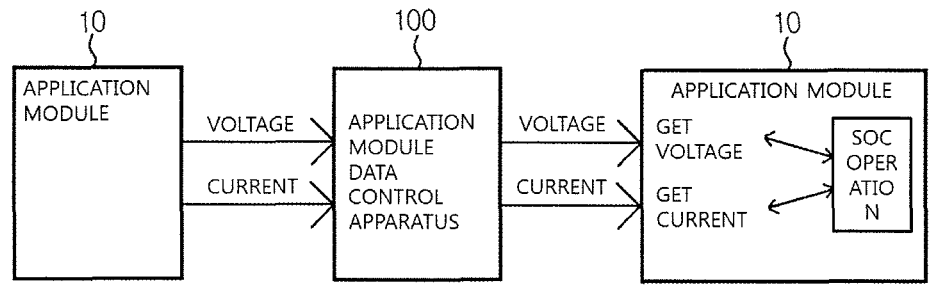
PROJECT B: SOC OPERATION BY CURRENT
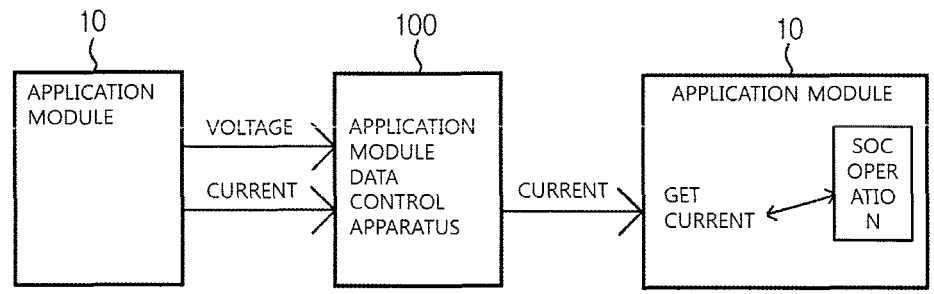

[Figure 6]
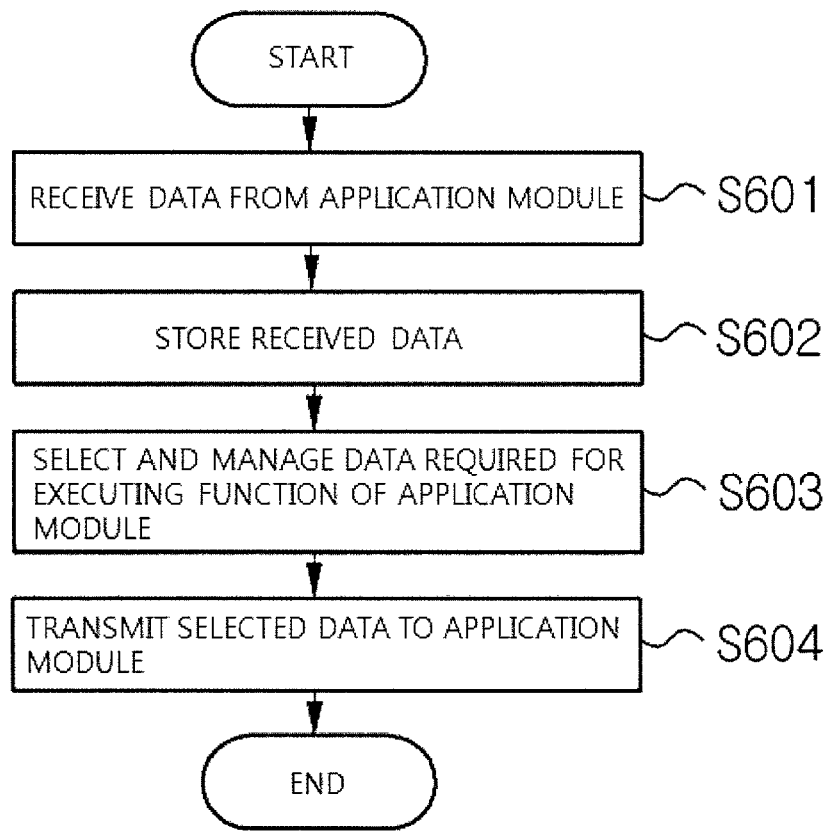

APPLICATION MODULE DATA CONTROL APPARATUS AND DATA CONTROL METHOD THEREOF

TECHNICAL FIELD

This application claims priority to and the benefit of Korean Patent Application No. 10-2013-0130744 filed in the Korean Intellectual Property Office on Oct. 31, 2013, the entire contents of which are incorporated herein by reference.

The present invention relates to an application module data control apparatus and a data control method thereof, and more particularly, to an application module data control apparatus and a data control method thereof which relay sharing of data to be shared among one or more application modules that perform functions of a battery management system (BMS) in the middle to remove data dependency of one or more respective application modules.

BACKGROUND ART

In general, batteries used for an electric vehicle (EV), a hybrid vehicle (HV), and a home or industry, that is, secondary batteries are high in application easiness depending on a product group and have electrical characteristics such as high energy density, and the like.

The secondary batteries have attracted public attention as a new energy source for friendly-environment and improved energy efficiency in that no by-product is generated depending on use of energy in addition to a primary advantage of remarkably reducing use of fossil fuel.

In this case, when multiple secondary batteries alternately perform charging and discharging, the multiple secondary batteries need to be managed so that the batteries maintain an appropriate operating state and performance by efficiently controlling the charging and discharging of the secondary batteries.

To this end, a battery management system (BMS) that manages a state and a performance of the battery is provided. The BMS measures current, voltage, a temperature, and the like of the battery to estimate a state of charging (SOC) of the battery based on the measured current, voltage, temperature, and the like and controls the SOC so that fuel consumption efficiency is highest. The SOC of the battery that performs the charging and discharging needs to be accurately measured in order to accurately control the SOC.

Meanwhile, since the battery management system in the related art cannot be standardized, data between the application modules used in the battery management system in the related art are complicatedly combined. As a result, there are problems in that there is high data dependency among one or more application modules such that data related with a specific application module exists in another application module and independency among the application modules is not ensured.

For example, when data including voltage and current is transmitted from an application module A to an application module B, the application module B performs a function of calculating the SOC through the voltage and the current.

In this case, if an application module C may measure the SOC by not the voltage but only the current, when the application module A transfers the existing data (including both voltage and current) to the application module C, the application module C may not process the voltage transmitted from the application module A and thus may not exactly perform the SOC calculating function.

Further, in an AUTomotive System Architecture (AUTOSAR) meaning an automotive standard software architecture, in the related art, an AUTOSAR Compliant software module cannot be simultaneously applied to application layers of an opened AUTOSAR and a non-opened AUTOSAR (NON-AUTOSAR), and as a result, there is inconvenience that the AUTOSAR Compliant standard software module should be individually developed according to the opened AUTOSAR and the non-opened AUTOSAR.

Therefore, in order to solve the problems of the existing battery management system which is not standardized as described above, the present inventor has invented an application module data control apparatus and a data control method thereof which relay sharing of data to be shared among one or more application modules that perform functions of a battery management system in the middle to remove data dependency of one or more respective application modules.

DETAILED DESCRIPTION OF THE INVENTION

Technical Problem

The present invention is contrived to solve the aforementioned problems and an object of the present invention is to provide an application module data control apparatus and a data control method thereof which can relay sharing of data to be shared among one or more application modules that perform functions of a battery management system (BMS) in the middle to remove data dependency of one or more respective application modules.

In more detail, another object of the present invention is to provide an application module data control apparatus and a data control method thereof which can receive data from one or more application modules and store the received data.

In addition, yet another object of the present invention is to provide an application module execution control apparatus and a execution control method thereof which can be simultaneously applied to application layers of an opened AUTOSAR and a non-opened AUTOSAR.

In addition, yet another object of the present invention is to provide an application module data control apparatus and a data control method which can transmit stored result data to a specific application module through a management function when transmission of the result data is requested from the specific application module.

Technical Solution

An exemplary embodiment of the present invention provides an application module data control apparatus including: a data transmitting/receiving unit configured to transmit and receive one or more data from one or more application modules; a data storing unit configured to store one or more received data; and a data managing unit configured to select the data required for executing respective functions of one or more application modules among the stored data and transferring the selected data to the data transmitting/receiving unit so as to be transmitted to one or more application modules.

The data transmitting/receiving unit may further include a share-interface configured to connect the data storing unit with one or more application modules and relay data transmission/reception among one or more application modules The data storing unit may be configured so that the stored respective data are independently defined.

The data may include result data generated by executing a function of a first application module among one or more application modules.

The data managing unit may control the data transmitting/receiving unit so as to transmit the stored result data to a second application module through a management function when the transmission of the result data is requested from the second application module.

Another exemplary embodiment of the present invention provides an application module data control method including: (a) receiving one or more data from one or more application modules by a data transmitting/receiving unit; (b) storing the received data by a data storing unit; (c) selecting and managing the data required for executing respective functions of one or more application modules among the stored data by a data managing unit; and (d) transmitting the selected and managed data to one or more application modules by the data transmitting/receiving unit.

The step (a) may further include (a1) connecting the data storing unit with one or more application modules through a share-interface; and (a2) relaying data sharing between one or more application modules and the data storing unit.

The step (c) may further include (c1) independently defining the stored data, respectively.

The method may further include (e) receiving result data generated by executing the function of a first application module among one or more application modules.

The step (c) may further include (c2) controlling the data transmitting/receiving unit so as to transmit the stored result data to a second application module through a management function when the transmission of the result data is requested from the second application module.

Advantageous Effects

Since data are received from one or more application modules and the received data are stored, the data associated with a specific application module does not exist in another application module, and as a result, the present invention has an advantage of ensuring data independency between respective application modules.

Further, since the data are received from one or more application modules and the received data are stored, the data of another application module is not changed due to the data change of the specific application module, and as a result, the present invention has an advantage of removing dependency between the data.

BRIEF DESCRIPTION OF DRAWINGS

FIG. 1 is a block diagram illustrating a configuration of an electric vehicle 1.

FIG. 2 is a diagram illustrating a data transmitting/receiving state among one or more application modules 10 in the related art.

FIG. 3 is a block diagram illustrating a configuration of an application module data control apparatus 100 according to an exemplary embodiment of the present invention.

FIG. 4 is a block diagram illustrating a configuration of the application module data control apparatus 100 according to the exemplary embodiment of the present invention.

FIG. 5 is a diagram illustrating a data transmitting/receiving state according to the exemplary embodiment of the present invention.

FIG. 6 is a flowchart illustrating an operating sequence of the application module data control apparatus 100 according to the exemplary embodiment of the present invention.

BEST MODE

Hereinafter, preferred embodiments will be presented in order to help understand the present invention. However, the exemplary embodiments are just provided to easily understand the present invention and contents of the present invention are not limited to the exemplary embodiments.

FIG. 1 is a block diagram illustrating a configuration of an electric vehicle 1.

Referring to FIG. 1, in general, the electric vehicle 1 may be configured to include a battery 2, a battery management system (BMS) 3, an electronic control unit (ECU) 4, an inverter 5, and a motor 6.

The battery 2 is an electric energy source that drives the electric vehicle 1 by providing drive force to the motor 6. The battery 2 may be charged or discharged by the inverter 5 depending on driving of the motor 6 or an internal combustion engine (not illustrated).

Herein, the type of battery 2 is not particularly limited and may be constituted by, for example, a lithium ion battery, a lithium polymer battery, a nickel cadmium battery, a nickel hydrogen battery, a nickel zinc battery, and the like.

Further, the battery 2 is formed by a pack in which a plurality of battery cells are connected in series or in parallel. In addition, one or more packs are provided to form the battery 2.

The BMS 3 estimates a state of the battery 2 and manages the battery 2 by using the estimated state information. For example, the BMS 3 estimates and manages the state information of the battery 2, which includes a state of charging (SOC), a state of health (SOH), a maximum input/output power permission amount, an output voltage, and the like of the battery 2. In addition, the BMS 3 controls the charging or discharging of the battery 2 by using the state information and furthermore, may estimate an exchange time of the battery 2.

The ECU 4 is an electronic control apparatus that controls a state of the electric vehicle 1. For example, the ECU 4 determines a torque degree based on information including an accelerator, a brake, a speed, and the like and controls an output of the motor 6 to be suitable for torque information.

Further, the ECU 4 transmits a control signal to the inverter 5 so as to charge or discharge the battery 2 based on the state information including the SOC, SOH, and the like of the battery 2 received by the BMS 3.

The inverter 5 allows the battery 2 to be charged or discharged based on the control signal of the ECU 4.

The motor 6 drives the electric vehicle 1 based on control information (for example, torque information) received from the ECU 4 by using electric energy of the battery 2.

Since the electric vehicle 1 is driven by using the electric energy of the battery 2, the battery 2 and the motor 6 may be connected through various circuits.

As a result, the types of data (for example, a voltage and current measurement value, and the like of the battery 2) transmitted by one or more application modules connected with the BMS 3 for the battery 2 may be different from each other, and the resulting data compatibility between the application modules is required. Therefore, in the present invention, an application module data control apparatus 100 capable of enhancing data compatibility among one or more application modules and removing data dependency of the respective application modules will be described through FIGS. 3 to 5 to be described below.

FIG. 2 is a diagram illustrating a data transmitting/receiving state among one or more application modules 10 in the related art.

Referring to FIG. 2, one or more application modules 10 in the related art directly transmit and receive data to share the data.

Herein, one or more application modules 10 may mean modules that perform a function of the BMS 3, and include a measurement module, an estimation module, a diagnosis module, a calculation module, a communication module, a control module, a recording module, and the like.

Further, the data may include all of measurement information provided from the application module 10, and for example, may correspond to a voltage value and a current value measured from the application module 10.

When a data transmitting/receiving state among one or more application modules 10 in the related art is described as an example, in the case of a project A (a method of calculating the SOC of a secondary battery through the voltage value and the current value), an application module B 10 receiving the voltage value and the current value may calculate the SOC of the secondary battery through the voltage value and the current value. However, in the case of a project B (a method of calculating the SOC of the secondary battery through the current value), an application module C 10 receiving the current value may receive not the voltage value but only the current value and thus may not use the application module A 10 as it is and may not perform a proper SOC operation.

As a result, since the specific application module 10 and another application module 10 directly share the data, when the data of the specific application module 10 is changed, the data of another application module 10 associated with the specific application module 10 needs to be changed together.

Therefore, in the present invention, the application module data control apparatus 100 capable of remove data dependency among the respective application modules 10 will be described in more detail through FIGS. 3 to 5 to be described below.

FIG. 3 is a block diagram illustrating a configuration of an application module data control apparatus 100 according to an exemplary embodiment of the present invention, FIG. 4 is a block diagram illustrating a configuration of the application module data control apparatus 100 according to the exemplary embodiment of the present invention, and FIG. 5 is a diagram illustrating a data transmitting/receiving state according to the exemplary embodiment of the present invention.

Referring to FIGS. 3 to 5, the application module data control apparatus 100 according to the present invention includes a data transmitting/receiving unit 110, a data storing unit 120, and a data managing unit 130.

First, the data transmitting/receiving unit 110 may serve to transmit and receive the data from one or more application modules.

Herein, the data may mean result data generated by executing the function of the specific application module 10 among one or more application modules 10 and may include a voltage value and a current value measured from the specific application module 10.

The data transmitting/receiving unit 110 performing the role may include a share-interface 111.

The share-interface 111 connects the data storing unit 120 to be described below with one or more application modules 10 and may serve to relay data transmission and reception among one or more application modules.

The share-interface 111 may include a record-interface that allows the data included in the application module 10 to be written in the data storing unit 120 and a read-interface that allows the application module 10 to read the data input to the data storing unit 120.

Next, the data storing unit 120 may serve to store one or more data received from the aforementioned data transmitting/receiving unit 110.

The data storing unit performing the role may be configured so that the stored respective data may be independently defined. In addition, this is to remove dependency between the data by independently defining the respective data.

Meanwhile, as long as the data storing unit 120 performs the aforementioned role, it is noticed that storage capacity of the data storing unit 120 is not limited.

Finally, the data managing unit 130 may serve to select and manage data required for executing the function of the specific application module 10 among the data stored in the aforementioned data storing unit 120.

Here, the selecting and managing of the data required for executing the function may mean matching a difference because data required between the application module 10 calling the aforementioned result data and the application module 10 providing the result data are different from each other.

For example, it is assumed that the result data (including both the voltage value and the current value) transmitted from the application module A 10 may be stored in the data storing unit 120 and the application module B 10 calls the stored result data.

In this case, since the result data required in the application module B 10 is the current value, but the result data stored in the data storing unit 120 includes both the voltage value and the current value, the data managing unit 130 transfers only the current value except for the voltage value among the result data stored in the data storing unit 120 to the application module B 10. Accordingly, the application module B may freely call and use the result data regardless of the result data transmitted by the application module A 10.

Further, when the data managing unit 130 receives the request for the transmission of the result data from the specific application module, the data managing unit 130 may control the data transmitting/receiving unit 110 so as to transmit the data stored in the data storing unit 120 to the specific application module 10 through the management function.

As a result, the data managing unit 130 selects and manages the result data transmitted from one or more application modules 10, respectively, to remove data dependency among the application modules 10.

FIG. 6 is a flowchart illustrating an operating sequence of the application module data control apparatus 100 according to the exemplary embodiment of the present invention.

First, the data transmitting/receiving unit 110 receives one or more result data from one or more application modules 10 (S601). In this case, the data transmitting/receiving unit 110 connects the data storing unit 120 with one or more application modules 10 through the share-interface 111 and relays data sharing between the connected application modules 10 and the data storing unit 120.

Next, the result data received from the aforementioned data transmitting/receiving unit 110 is stored in the data storing unit 120 (S602).

Next, the data managing unit 130 selects and manages the result data required for the application module 10 calling the stored result data (S603). In this case, the data managing unit 130 allows the result data stored in the data storing unit 120 to be independently defined, respectively.

Next, the data transmitting/receiving unit 110 transmits the result data to the application module 10 calling the result data.

The present invention has been described with reference to the preferred embodiments. However, it will be appreciated by those skilled in the art that various modifications and changes of the present invention can be made within the scope without departing from the spirit and the scope which are defined in the appended claims and their equivalents.

The invention claimed is:

1. An application module data control apparatus, comprising:
   a data transceiver configured to:
      transmit and receive one or more result data generated by executing a function of a first application module among one or more application modules configured to perform separate functions of a battery management system (BMS) for the calculation of a state of charge (SOC) of a secondary battery, and
      relay, via a share-interface included in the data transceiver, only a portion of the one or more result data from the first application module to a second application module among the one or more application modules that is requested from the second application module, wherein the relay is performed by connecting a data storage with both the first application module and the second application module, the data storage being configured to store one or more received result data; and
   a data manager configured to select data from the one or more result data stored in the data storage that is required for executing a SOC operation via the second application module and transfer the selected data to the data transceiver so as to be transmitted to the second application module for performing the SOC operation,
   wherein the one or more received result data is a voltage value and a current value of the secondary battery,
   wherein the portion of the one or more result data relayed to the second application module is the current value, and
   wherein the one or more application modules include a measurement module, an estimation module, a diagnosis module, a calculation module, a communication module, a control module and a recording module.

2. An application module data control method, comprising:
   receiving, by a data transceiver, one or more result data generated by executing a function of a first application module among one or more application modules configured to perform separate functions of a battery management system (BMS) for the calculation of a state of charge (SOC) of a secondary battery;
   relaying, via a share-interface included in the data transceiver, the one or more result data from the first application module to a second application module among the one or more application modules that is requested from the second application module, wherein the relay is performed by connecting a data storage with both the first application module and the second application module;
   storing the received one or more result data by the data storage;
   selecting and managing data from the one or more result data stored in the data storage that is required for executing a SOC operation via the second application module; and
   transmitting, via the data transceiver, the selected and managed data to the second application module for performing the SOC operation,
   wherein the one or more received result data is a voltage value and a current value of the secondary battery,
   wherein the one or more application modules include a measurement module, an estimation module, a diagnosis module, a calculation module, a communication module, a control module and a recording module.

* * * * *